Aug. 25, 1964     G. JANOUSCHEK ETAL     3,145,829
TRANSPORT AND DISCHARGE DEVICE FOR PIECES OF PASTY MATERIAL
Filed Aug. 1, 1962     2 Sheets-Sheet 1
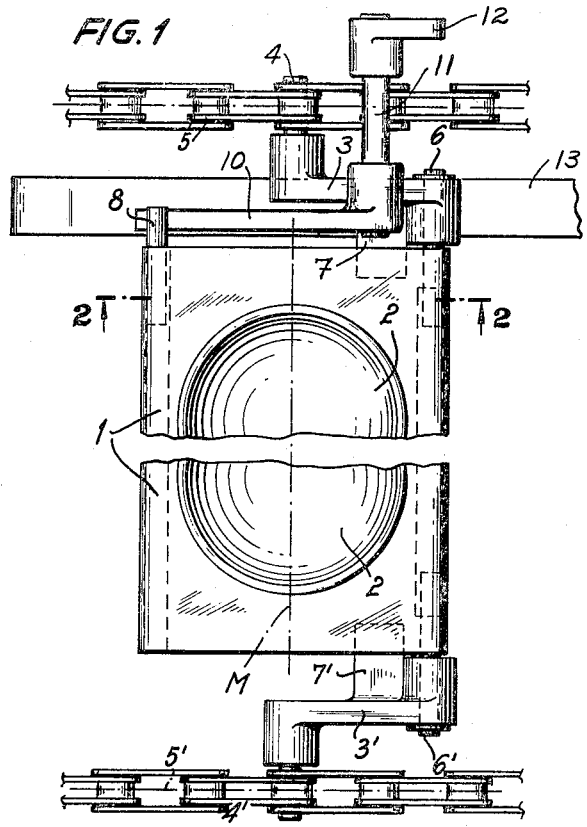
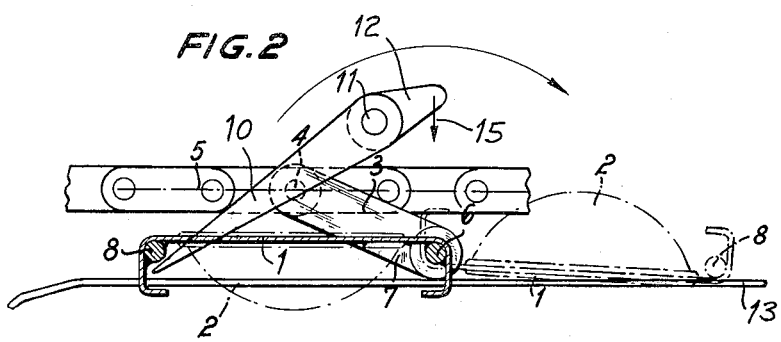
INVENTORS
GERALD JANOUSCHEK
OSKAR WOLFSRIED
BY Hane and Wydick
ATTORNEYS

United States Patent Office

3,145,829
Patented Aug. 25, 1964

3,145,829
TRANSPORT AND DISCHARGE DEVICE FOR
PIECES OF PASTY MATERIAL
Gerald Janouschek, Stuttgart-Unterturkheim, and Oskar
Wolfsried, Hegnach, near Waiblingen, Germany, assignors to Werner & Pfleiderer, Stuttgart-Feuerbach, Germany, a German firm
Filed Aug. 1, 1962, Ser. No. 213,914
Claims priority, application, Germany, Oct. 28, 1961,
W 30,960
7 Claims. (Cl. 198—145)

The present invention relates to conveyors for transporting pieces of dough or other pasty material through a treatment station, such as a fermentation cabinet, and for discharging the pieces from the conveyor after they have passed through the treatment station.

More particularly, the invention relates to conveyors in which individual dished carriers for dough or other material are suspended by means of end arms between two driven conveyor chains and the pieces of dough, after leaving the treatment station, are removed from the carriers by tilting or tripping the same. The pieces of dough or other material, as they fall away from the carrier, land on another conveyor which transports the pieces to another treatment station such as a forming or cutting station. To assure a smooth and efficient operation in the next station, it is essential that the pieces of dough or other material are placed on the second conveyor in an orderly and uniform distribution.

There are known various types of conveyor means of the general kind above referred to which all have in common that the entire suspension assembly is tripped to remove the pieces of dough or other material from the carriers by gravitational force only. While theoretically the pieces should slide uniformly out of the carriers, practical experience shows that such is not the case. Some of the pieces of dough or other material will adhere stronger to the carriers than others and the more strongly adhering pieces will yield somewhat slower to the gravitational pull than the other and will hence reach the second conveyor slightly later, thus upsetting the uniform distribution of the pieces of dough or other material on the second conveyor.

It is a broad object of the present invention to provide a novel and improved conveyor of the general kind above referred to from which the pieces of material are uniformly and practically instantly discharged when the conveyor is activated for discharge of the pieces of material, thereby assuring that the pieces of material are uniformly distributed on the second conveyor.

A more specific object of the invention is to provide a novel and improved conveyor of the general kind above referred to in which each carrier is abruptly arrested when it is tipped from its carrying position into its discharge position. The resulting jolt causes a practically immediate and simultaneous loosening of all the pieces of material on the carrier, irrespective of whether they adhere more or less strongly to the carrier.

Another more specific object of the invention is to provide a novel and improved conveyor of the general kind above referred to in which the carriers only, rather than the entire suspension assembly as heretofore customary, are tilted for discharge, thereby making conveniently possible the aforementioned abrupt halt of the carriers upon reaching the discharge position.

It is also an object of the invention to provide a novel and improved conveyor of the general kind above referred to, the carriers of which are automatically returned from the discharge position into the carrying position for reloading with material.

Other and further objects, features and advantages of the invention will be pointed out hereinafter and set forth in the appended claims constituting part of the application.

In the accompanying drawing a preferred embodiment of the invention is shown by way of illustration and not by way of limitation.

In the drawing:

FIG. 1 is a fragmentary plan view of a conveyor and discharge assembly according to the invention designed for transporting and discharging pieces of dough.

FIG. 2 is a section taken on line 2—2 of FIG. 1 and,

Figure 3:
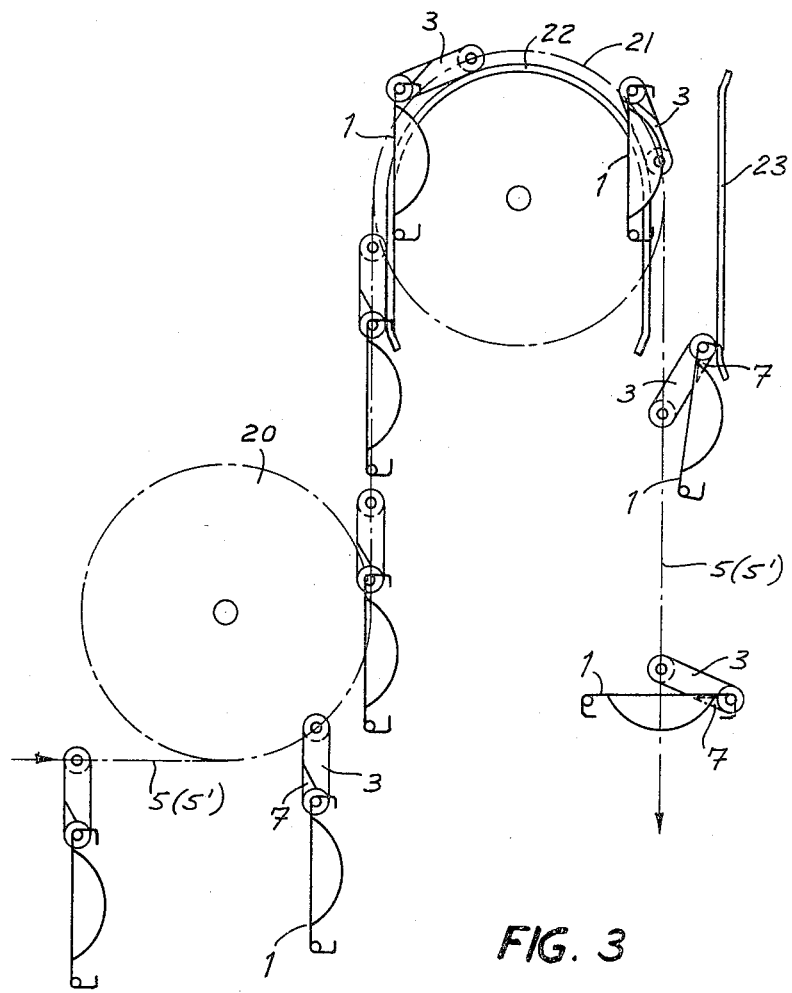
FIG. 3 is a diagrammatic view of an arrangement for returning the carriers from the discharge position to the loading position.

FIGS. 1 and 2 should be visualized as showing as part of a conveyor assembly for transporting pieces of dough through a treatment station, such as a fermention cabinet, and for discharging the pieces of dough after having passed the cabinet. The fermentation cabinet itself is not shown as it does not constitute part of the invention and its design is not necessary for the understanding of the invention. While only one dough carrier is shown, in actual practice a plurality of carriers are supported and transported by the conveyor means. The discharged pieces of dough should be visualized as falling upon a second conveyor for transport to a further treatment station. The second conveyor is not shown, since it does not constitute part of the invention.

FIGS. 1 and 2 show in detail the discharge means for discharging the pieces of dough at a selected location. The invention is concerned specifically with the discharge means.

Referring now to FIGS. 1 and 2 in detail, there is shown a dough carrier 1 of generally rectangular outline. The carrier is formed with one or several dished portions 2 for the reception of pieces of dough, as is indicated by the broken lines in FIG. 1. It is, of course, also possible to provide as carrier 1 a frame structure in which are fitted receptacles 2 for the dough. The number of receptacles 2 provided on each carrier depends upon the structure of the fermentation cabinet or other treatment device.

Each carrier is suspended between two conveyor chains 5 and 5', which are synchronously driven by suitable drive means in the direction indicated by the arrow. Suspension of the carriers is effected by means of arms or links 3 and 3' which, at one end, are hinged to a pivot pin 4 and 4' respectively on the chains and, at the other end, to a pivot pin 6 and 6' respectively on the carrier. As is evident from FIG. 1, the pivot axes of the connections of the arms at the chains are in alignment with the lengthwise mid axis M of the carriers. The pivot axes of the connections of the arms at the carriers are disposed posterior in reference to the direction of travel of the carriers, more specifically, the pivot axes are in substantial alignment with the trailing edge of the carriers. The carriers are held in the position of FIGS. 1 and 2, which is the carrying position, by means of brackets 7 and 7' extending from arms 3 and 3' and underlying the carriers, as is clearly shown in FIG. 1.

Discharge of the carriers is effected by means of a tripper lever 10 fixedly seated on a shaft 11. This shaft also seats a second lever 12. The free end of lever 10 is engageable with a lug 8 protruding from one of the short sides of each carrier.

The aforedescribed discharge control assembly 10, 11 and 12 is stationarily disposed at the discharge location. The assembly further includes a guide bar 13 stationarily disposed underneath lever 10 and shaft 11.

The function of the discharge assembly as hereinbefore described is as follows:

Let it be assumed that a lug 8 has just reached the tip of tripper lever 10 resting on guide bar 13. At this moment, a downwardly directed force is exerted upon lever 12 as indicated in FIG. 2 by an arrow 15. As a result, the respective carrier is pivoted about pins 6 and 6' through an angle of 180 degrees from the full line position of FIG. 2 into the dotted line position, which is the discharge position of the carrier. When the carrier arrives in that position, its lug 8 impacts upon guide bar 13, thereby causing an abrupt halt of the carrier. As previously explained, such abrupt halt results in an immediate and simultaneous loosening of the pieces of dough placed on the carrier.

As the discharge carrier continues its travel and runs off guide bar 13, the carrier will drop into a downwardly hanging position, due to its own weight.

Referring now to FIG. 3, the lower left corner of this figure shows a carrier in its downwardly hanging position and the purpose of the arrangement of FIG. 3 is to return each carrier into its carrying position, that is, the position shown in FIG. 1 and also in FIG. 2 in full lines. To this end, the conveyor chains are guided by means of a first guide roller 20 from the initial horizontal direction of travel to an upward direction of travel. They are then guided by a second guide roller 21 to a downward direction of travel. The carrier assemblies, while being guided by guide roller 21, coact with a curved guide track 22, which supports the arms 3, but leaves the carriers 1 freely suspended. As the arms glide along curved track 22, they are gradually tilted through an angle of 180 degrees. As is apparent, the arms, as they reach the apex of curved track 22, will occupy an up and down position. This position is, of course, an unstable one and the arms will immediately tip from left to right. The tilting of the carriers from the upright position toward the carrying position of FIG. 1 occurs in two stages. In the first stage, the movement of the carriers is restrained by a straight second guide track 23. As soon as the carriers, or more specifically the arms thereof, are free of guide track 23, they fall back into the position shown for the last carrier assembly at the right lower end of FIG. 3, in which the carriers are again supported by brackets 7 extending from the arms. The carrier is now ready for reloading.

As is evident, instead of two levers 10 and 11, a two-armed lever may be provided with is pivotally seated on shaft 11. The force for turning levers 10 and 12 may be derived from the drive means for chains 5 and 5'. The control of such lever arrangement is well known in the art and should be visualized as being conventional.

While the invention has been described in detail with respect to a certain now preferred example and embodiment of the invention it will be understood by those skilled in the art after understanding the invention, that various changes and modifications may be made without departing from the spirit and scope of the invention, and it is intended, therefore, to cover all such changes and modifications in the appended claims.

What is claimed as new and desired to be secured by Letters Patent is:

1. A transport and discharge device for pieces of dough, said device comprising a movable conveyor means; a plurality of carriers for placing thereupon the material to be transported to a discharge location; a support means for each of said carriers, each of said support means including an arm pivotally secured at one end to the conveyor and at the other end to the respective carrier, the pivotal axes of said arms being parallel to and transverse of the direction of travel of said conveyor, the axis of the pivot connections of the arms at the conveyors coinciding with the midaxis of the respective carrier and the axis of the pivot connections of the arms at the respective carrier being spaced apart from said midaxis, and a bracket extending from said arm and underlying the respective carrier intermediate said pivot axes to support the same in a material supporting upwardly facing position; and discharge means stationarily mounted at said discharge location, said discharge means including lever means engaging successive carriers upon arrival thereof at said discharge location, pivoting of the lever means when engaged imparting to the carriers one by one a swinging movement about the pivotal connections of the arms at the carrier from said support position into a downwardly facing discharge position, and stationarily mounted stop means intercepting the tilting movement of each carrier in said discharge position thereby abruptly arresting the tilting movement of the carrier to subject the same to a jar causing an instant discharge of the material supported thereon.

2. A device according to claim 1 wherein said pivot connection at the carrier is disposed in alignment with one of the transverse edges of the carrier.

3. A device according to claim 1 and also comprising a restoring means for restoring each carrier to its supporting position after the carrier is free from the stop means due to the continued travel of the conveyor means, said restoring means including guide means engaging successive carriers and tilting the same in a direction of tilt opposite to the direction of tilt for moving the carriers from the support position towards the discharge position.

4. A transport and discharge device for pieces of dough, said device comprising conveyor means including a pair of synchronously movable parallel conveyors; a plurality of carriers for placing thereupon pieces of material to be transported to a discharge location; a support means for supporting each said carrier between the said two conveyors, each of said support means including an arm at each side of the carrier adjacent to one of the conveyors, each of said arms being pivotally secured at one end to the respective conveyor and at the other end to the carrier, the pivotal axes of said arms being parallel to and transverse of the direction of travel of said conveyor, the axis of the pivot connections of the arms at the conveyors coinciding with the midaxis of the respective carrier and the axis of the pivot connections of the arms at the respective carrier being spaced apart from said midaxis, and a bracket extending from each of said arms and underlying the respective carrier to support the same in a material supporting upwardly facing position; and discharge means stationarily mounted at said discharge location, said discharge means including pivotal lever means engaging successive carriers upon arrival at the discharge location pivoting of the lever means when engaged imparting to each carrier a swinging movement about the pivotal connections of the arms at the carrier from said support position into a downwardly facing discharge position, and stationarily mounted stop means intercepting the tilting movement of each carrier in said discharge position, thereby abruptly arresting the tilting movement of the carriers to subject the same to a jar causing an instant discharge of the material supported thereon.

5. A device according to claim 4 wherein said pivot connections at the carrier are disposed in alignment with one of the transverse edges of the carrier.

6. A device according to claim 4 wherein said lever means comprise a pivotally mounted lever engageable at one end with each carrier arriving at the discharge location to swing each carrier continuously through an angle of 180° about the pivotal connections of the arms at the carrier into its discharge position in response to a pivoting of said lever.

7. A device according to claim 4 wherein said stop means comprise an abutment member disposed along the side of one of said conveyors against which abutment member each carrier abuts when tilted into its discharge position and from which each carrier is freed as the conveyors continue along their paths.

References Cited in the file of this patent

UNITED STATES PATENTS

| | | |
|---|---|---|
| 1,156,446 | Taylor | Oct. 12, 1915 |
| 1,343,184 | Baker | June 8, 1920 |
| 2,189,243 | Evans | Feb. 6, 1940 |
| 2,938,621 | Aasted | May 31, 1960 |
| 3,044,602 | Amato | July 17, 1962 |
| 3,056,361 | Law | Oct. 2, 1962 |